United States Patent
Chien et al.

(10) Patent No.: US 7,287,100 B2
(45) Date of Patent: Oct. 23, 2007

(54) PORTABLE COMPUTER SYSTEM HAVING WIRELESS TRANSMISSION FOR OPERATING PLURALITY OF PERIPHERAL DEVICES HAVING EXTERNAL PORT SIGNALS THAT PRODUCE ENCODED PRIORITY SIGNALS

(75) Inventors: Tsan-Nan Chien, Taipei (TW); Yen-Chun Chang, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 625 days.

(21) Appl. No.: 10/899,852

(22) Filed: Jul. 27, 2004

(65) Prior Publication Data
US 2005/0033883 A1    Feb. 10, 2005

(30) Foreign Application Priority Data
Aug. 8, 2003   (TW) .............................. 92121935 A

(51) Int. Cl.
  G06F 13/14    (2006.01)
  G06F 1/16    (2006.01)
  G06F 13/00    (2006.01)
(52) U.S. Cl. .................... 710/8; 710/1; 710/9; 710/10; 710/15; 710/34; 710/62
(58) Field of Classification Search ............ 710/1, 710/8–10, 15, 34, 62; 361/683
See application file for complete search history.

(56) References Cited

U.S. PATENT DOCUMENTS

| | | | |
|---|---|---|---|
| 5,864,708 A * | 1/1999 | Croft et al. ............... | 710/1 |
| 6,166,734 A | 12/2000 | Nahi et al. ............... | 345/335 |
| 6,813,660 B2 * | 11/2004 | Chen et al. ............... | 710/62 |
| 6,889,057 B2 * | 5/2005 | Tordera et al. ............ | 455/557 |
| 2005/0013103 A1 * | 1/2005 | Chandley ................. | 361/683 |

* cited by examiner

Primary Examiner—Tammara Peyton
(74) Attorney, Agent, or Firm—Thomas, Kayden, Horstemeyer & Risley

(57) ABSTRACT

A portable computer system includes a portable computer and an integrated device both having wireless data transmission interface. The integrated device is connected to various peripheral devices with different interfaces and controlled by corresponding external port signals. When the portable computer wants to access the peripheral devices, a signal processor integrates and encodes all the external port signals to generate a single encoded signal to be fed to the integrated devices via the wireless transmission interface. After the integrated device receives the encoded signal, a signal processor decodes it to reproduce individual external port signals to be transferred to each corresponding peripheral device to control the operation thereof. During the encoding process, the signal processor may set the priorities according to the properties of each signal and add the identification information of the portable computer. Then, the signal processor integrates the priorities, identification information and all external port signals and produces the encoded signal. Since the encoded signal includes the user information, different users may simultaneously access the peripherals to achieve the object of peripheral-sharing.

8 Claims, 2 Drawing Sheets

PORTABLE COMPUTER SYSTEM HAVING WIRELESS TRANSMISSION FOR OPERATING PLURALITY OF PERIPHERAL DEVICES HAVING EXTERNAL PORT SIGNALS THAT PRODUCE ENCODED PRIORITY SIGNALS

This application claims the benefit of Taiwan application Serial No. 92121935, filed Aug. 8, 2003, the subject matter of which is incorporated herein by reference.

BACKGROUND OF THE INVENTION

1. Field of the Invention

The invention relates to a computer system, and more particularly to a portable computer system.

2. Description of the Related Art

In the past, the extensibility of the portable computer, such as a notebook computer or a panel computer, had been always complained. With the quickly development of the computer industry, the functions of the portable computer have been greatly advanced. In addition to possessing the high mobility, the present notebook computer also has complete multimedia functions.

Contradictorily, most peripheral devices are wired apparatus with low mobility, while the notebook computer is a product with high mobility. After the notebook computer is connected to a peripheral device, the movable range thereof is restricted by the wire and the convenience thereof is greatly reduced. At present, the connections between the notebook computer and the peripheral device may be roughly divided into the following four kinds of connections.

1. Direct Connection.

The notebook computer may be directly connected to wired peripheral devices through the built-in external ports on its casing. In this way, the user has to inconveniently disconnect or connect various connection wires after the notebook computer has been taken out or in.

2. Network Connection.

The notebook computer may be connected to wired peripheral devices on the network through the wireless or wired Intranet. This way is only suitable for the modern network offices because sufficient network has to be constructed. In addition, the network setup has to be performed by the network supervisor with professional background, and a general user cannot easily complete the setup.

3. Bluetooth Connection.

The notebook computer can access peripheral devices via Bluetooth modules where the notebook computer and the peripheral devices are both equipped with built-in Bluetooth module. In this architecture, all the peripheral devices have to be equipped with built-in Bluetooth modules so as to enable the notebook computer to be moved freely. But the peripheral devices with the built-in Bluetooth modules are more expensive than the wired peripheral devices.

4. Integrated Device Connection.

The notebook computer has an optional integrated device to be connected to various peripheral devices. The integrated device may be, for example, a docking station, an external port replicator, or the like. The wired peripheral devices may be connected to the integrated device through their original interfaces, and then the integrated device may be connected to the notebook computer through a single connector. The user only has to connect the notebook computer to the docking station or external port replicator after the notebook computer has been taken in. Then, the user may use or access the peripheral devices. Although this way really reduces the inconvenience of plugging various wired peripheral devices, the problem of incapable of accessing the peripheral devices while the notebook computer is freely moved indoors because the positions of the integrated devices are fixed and the notebook computer has to be fixed to the integrated device.

Since the conventional connection ways cannot thoroughly solve the connection problems between the portable computer and the peripheral devices, it is necessary to provide a novel architecture to enable the portable computer to freely access the peripheral devices without influencing the mobility thereof.

SUMMARY OF THE INVENTION

It is therefore an object of the invention to provide a portable computer system to enable a user to move a portable computer freely and access the peripheral devices within a limited zone.

The invention achieves the above-identified object by providing a portable computer system, which is briefly described in the following.

The portable computer system includes a portable computer and an integrated device both having wireless data transmission interface. The integrated device is connected to various peripheral devices with different interfaces and controlled by corresponding external port signals. When the portable computer wants to access the peripheral devices, a signal processor integrates and encodes all the external port signals to generate a single encoded signal to be fed to the integrated devices via the wireless transmission interface. After the integrated device receives the data from the portable computer, a signal processor decodes the encoded signal to reproduce individual external port signals to be transferred to each corresponding peripheral device so as to control the operation thereof. During the encoding process, the signal processor may set the priorities according to the properties of each signal and add the identification information of the portable computer. Then, the signal processor integrates the priorities, identification information and all external port signals and produces the encoded signal. Since the encoded signal includes the user information, different users may simultaneously access the peripherals to achieve the object of peripheral-sharing.

Other objects, features, and advantages of the invention will become apparent from the following detailed description of the preferred but non-limiting embodiment. The following description is made with reference to the accompanying drawings.

DETAILED DESCRIPTION OF THE INVENTION

Figure 1:
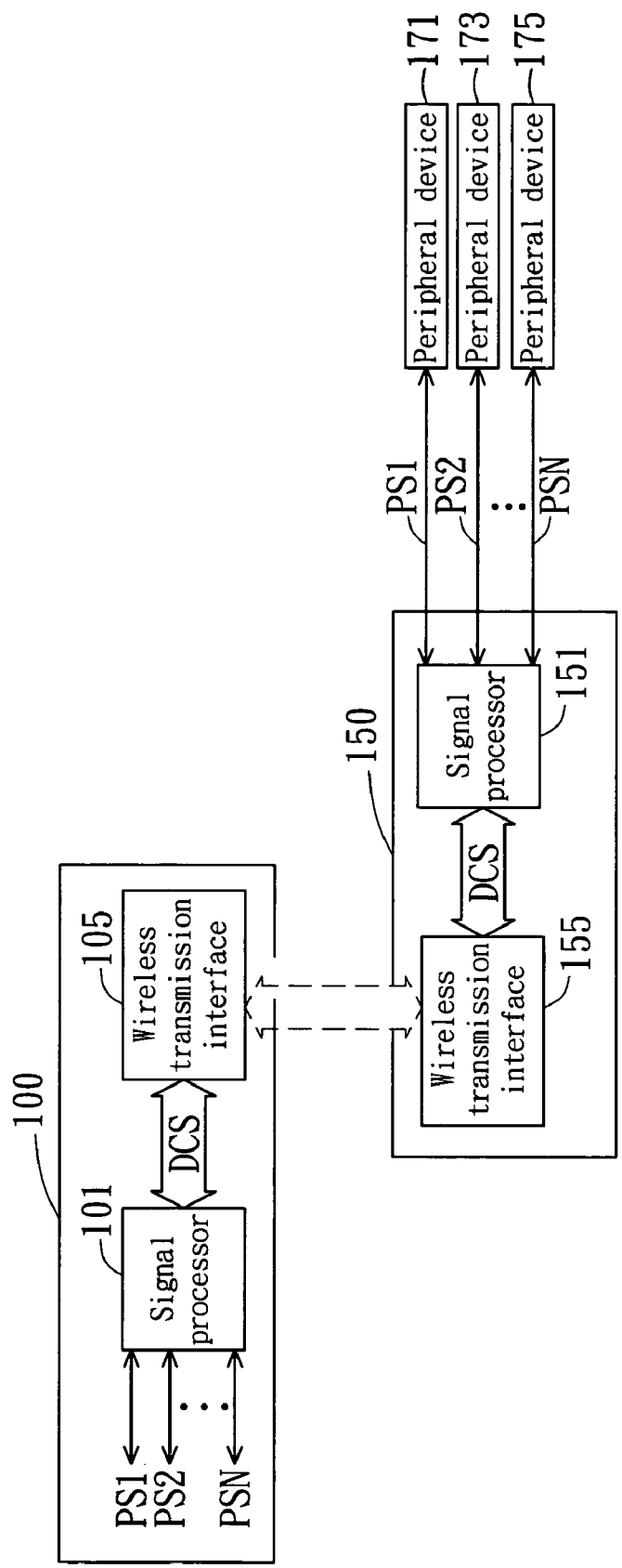
FIG. 1 is a block diagram showing a portable computer system according to a preferred embodiment of the invention.

Instead of fixing the portable computer to an integrated device (e.g., a docking station, an external port replicator, or the like) through a connector, the portable computer system of the invention utilizes a single wireless transmission interface to achieve the data transmission between a portable computer and an integrated device so as to enable a user to freely move the portable computer within a limited zone and access the peripheral devices. FIG. 1 is a block diagram showing a portable computer system according to a preferred embodiment of the invention. Referring to FIG. 1, the portable computer system includes a portable computer 100 and an integrated device 150. After peripheral devices 171, 173 and 175 are connected to the integrated device 150, the portable computer 100 may transfer control signals to the integrated device 150 to access the peripheral devices connected to the integrated device 150 in a wireless manner. In order to support various interfaces of the peripheral devices widely, various external ports have to be disposed on the integrated device 150 so as to connect the integrated device 150 to the peripherals with different specifications. For example, the external ports may be monitor ports, serial ports, parallel ports, IEEE 1394 ports, ports for external storage drives, PS/2 ports, USB ports, audio input/output ports, or network ports (LAN ports). Of course, the peripheral devices 171, 173 and 175 operate according to different external port signals PS1, PS2, . . . , PSN owing to different interfaces thereof, wherein the external port signals PS1, PS2, . . . , PSN may be, for example, monitor port signals, serial port signals, parallel port signals, PS/2 port signals, USB port signals, audio port signals, network port signals, or the like.

The portable computer 100 also accesses the peripheral devices with various specifications according to the external port signals PS1, PS2, . . . , PSN. Unlike the prior art method, the portable computer 100 utilizes a signal processor 101 to integrate and encode all the external port signals PS1, PS2, . . . , PSN, and then feed a single encoded signal DCS to a wireless transmission interface 105. The encoded signal DCS is transferred to the integrated device 150 in a wireless transmission manner. The integrated device 150 is equipped with a wireless transmission interface 155 and a signal processor 151. After receiving the data transferred from the portable computer 100, the wireless transmission interface 155 may feed the encoded signal DCS to the signal processor 151, which decodes the encoded signal DCS and reproduces therefrom individual external port signals PS1, PS2, . . . , PSN to control the operations of the corresponding peripheral devices 171, 173 and 175. The wireless transmission interfaces 105 and 155 may be, for example, transmission interfaces meeting the IEEE 802.11a/b/g specification. Similarly, when the peripheral devices 171, 173 and 175 want to transfer data back to the portable computer 100, the signal processor 151 will first integrate and encode the external port signals PS1, PS2, . . . , PSN. Then, an encoded signal DCS is generated and fed to the wireless transmission interface 155, via which the encoded signal DCS is transferred to the portable computer 100 in a wireless transmission manner. After the wireless transmission interface 105 has received the data transferred from the integrated device 150, the encoded signal DCS may be fed to the signal processor 101, which decodes the encoded signal DCS and reproduces therefrom individual external port signals PS1, PS2, PSN for the subsequent data processing.

Figure 2:
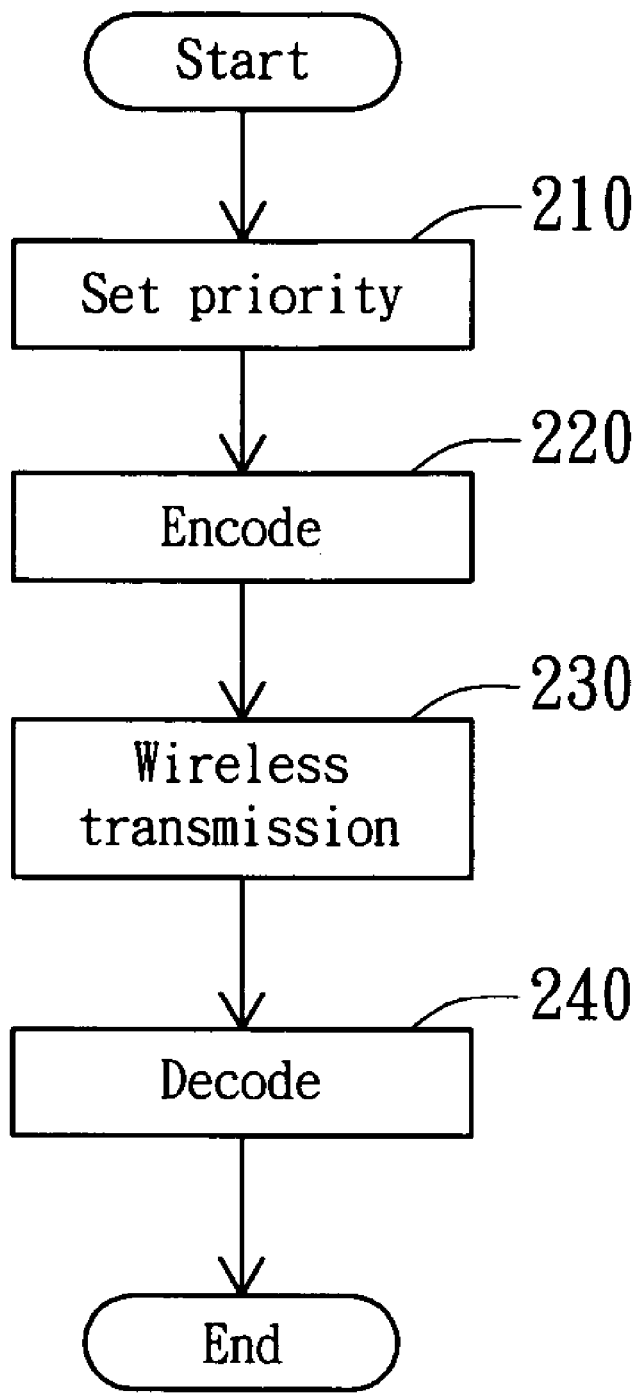
FIG. 2 is a flow chart showing a method for a portable computer to access the peripheral devices according to a preferred embodiment of the invention.

FIG. 2 is a flow chart showing a method for a portable computer to access the peripheral devices according to the preferred embodiment of the invention. When the signal processor 101 integrates the external port signals, the priorities of the signals will be arbitrated and set, wherein the external port signal, such as the monitor port signal, which cannot be delayed, possesses a higher priority (step 210). In order to enable the integrated device 150 to identify different users, the signal processor 101 adds the identification information of the portable computer 100 during the encoding process. Then, the priority, identification information and all the external port signals are integrated and encoded to produce the encoded signal DCS (step 220). Next, the wireless transmission interface 105 may carry the encoded signal DCS on the radio for output (step 230). When the integrated device 150 receives the radio, the signal processor 151 may be used to decode the encoded signal DCS and to reproduce the external port signals, which are then transferred to each corresponding peripheral device to control the operations of the peripherals (step 240).

Since the identification information is added during the encoding process, different users may simultaneously share the integrated device without confusion. In other words, such an architecture provides a peripheral-sharing mechanism different from the network-sharing. Thus, the users may sufficiently enjoy the convenience of peripheral-sharing without having to set the network.

The portable computer system according to the embodiment of the invention at least has the following advantages.

1. The portable computer may access the peripherals in a wireless transmission manner without being tied by wires, and the mobility thereof is greatly enhanced.

2. The peripheral-sharing mechanism is implemented in a wireless transmission architecture, and the convenience is greatly enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable computer system for operating a plurality of peripheral devices according to a plurality of external port signals, the portable computer system comprising:

an integrated device, which has a wireless transmission interface and a first signal processor connected to the peripheral devices, for controlling the peripheral devices according to the external port signals; and a portable computer having the wireless transmission interface and a second signal processor, wherein the second signal processor is for arbitrating the external port signals to set priorities thereof, adding user identification information of the portable computer and encoding the external port signals to produce an encoded signal according to the priorities;

wherein the integrated device and the portable computer receive/output the encoded signal through the wireless transmission interface, and after the second signal processor feeds the encoded signal to the first signal processor, the first signal processor decodes the encoded signal to generate the external port signals and recognize the user identification information to control the peripheral devices.

2. The portable computer system according to claim 1, wherein the integrated device is a docking station.

3. The portable computer system according to claim 1, wherein the integrated device is an external port replicator.

4. The portable computer system according to claim 1, wherein the external port signals comprises monitor port signals, serial port signals, parallel port signals, PS/2 port signals, USB port signals, IEEE 1394 port signals, signals of port for external storage drive, audio ports signals or network port (LAN port) signals.

5. A portable computer system for operating a plurality of peripheral devices according to a plurality of external port signals, the portable computer system comprising:
an integrated device, which has a first wireless transmission interface and a first signal processor connected to the peripheral devices, for controlling the peripheral devices according to the external port signals; and
a portable computer having a second wireless transmission interface corresponding to the first wireless transmission interface, and a second signal processor, wherein the second signal processor is for arbitrating the external port signals to set priorities thereof, adding user identification information of the portable computer and encoding the external port signals to produce an encoded signal according to the priorities;
wherein the integrated device and the portable computer receive/output the encoded signal through the first and second wireless transmission interfaces, and after the second signal processor feeds the encoded signal to the first signal processor, the first signal processor decodes the encoded signal to generate the external port signals and recognize the user identification information to control the peripheral devices.

6. The portable computer system according to claim 5, wherein the integrated device is a docking station.

7. The portable computer system according to claim 5, wherein the integrated device is an external port replicator.

8. The portable computer system according to claim 5, wherein the external port signals comprises monitor port signals, serial port signals, parallel port signals, PS/2 port signals, USB port signals, IEEE 1394 port signals, signals of port for external storage drive, audio ports signals or network port (LAN port) signals.

* * * * *